US011973825B1

(12) United States Patent
May et al.

(10) Patent No.: US 11,973,825 B1
(45) Date of Patent: *Apr. 30, 2024

(54) SYSTEM, METHOD, AND COMPUTER PROGRAM FOR BLOCKCHAIN-BASED ENTITY GROUP MANAGEMENT

(71) Applicant: Amdocs Development Limited, Limassol (CY)

(72) Inventors: Pavel Yefim May, Rishon leZion (IL); Sergey Podalov, Herzliya (IL); Vladimir Tkach, Kefar Yona (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,511

(22) Filed: Feb. 10, 2023

Related U.S. Application Data (63) Continuation of application No. 17/239,430, filed on Apr. 23, 2021, now Pat. No. 11,606,424.

(51) Int. Cl.
*H04L 67/104* (2022.01)
*H04L 9/40* (2022.01)
*H04L 67/1061* (2022.01)

(52) U.S. Cl.
CPC ........ *H04L 67/1044* (2013.01); *H04L 63/101* (2013.01); *H04L 63/102* (2013.01); *H04L 63/104* (2013.01); *H04L 67/1065* (2013.01)

(58) Field of Classification Search
CPC ............... H04L 67/1044; H04L 67/025; H04L 67/1065; H04L 63/0823; H04L 63/12; H04L 63/101; H04L 63/102; H04L 63/104

See application file for complete search history.

(56) References Cited

U.S. PATENT DOCUMENTS

| | | | |
|---|---|---|---|
| 10,326,802 B1 * | 6/2019 | Irwan | H04L 67/025 |
| 2018/0285996 A1 * | 10/2018 | Ma | H04L 9/3297 |
| 2018/0343307 A1 * | 11/2018 | Lotter | G06Q 50/188 |
| 2019/0377889 A1 * | 12/2019 | Mertens | G06F 21/60 |
| 2020/0092114 A1 * | 3/2020 | Androulaki | H04L 63/0823 |
| 2020/0151350 A1 * | 5/2020 | Irazabal | G06F 16/2308 |
| 2020/0169546 A1 * | 5/2020 | Padmanabhan | H04L 9/3236 |
| 2020/0184582 A1 * | 6/2020 | Fox | G06N 5/02 |
| 2021/0056638 A1 * | 2/2021 | Davis | G06Q 20/3827 |
| 2021/0194887 A1 * | 6/2021 | Zhang | H04L 63/12 |

* cited by examiner

*Primary Examiner* — Jungwon Chang
(74) *Attorney, Agent, or Firm* — Zilka-Kotab, P.C.

(57) ABSTRACT

As described herein, a system, method, and computer program are provided for blockchain-based entity group management. An instance of a blockchain is maintained for each entity group of a plurality of defined entity groups. Further, the instance of the blockchain maintained for each entity group of the plurality of defined entity groups is utilized to manage group membership for the entity group, and control access by members of the entity group to a plurality of services having functionality configured for the plurality of defined entity groups.

18 Claims, 8 Drawing Sheets

SYSTEM, METHOD, AND COMPUTER PROGRAM FOR BLOCKCHAIN-BASED ENTITY GROUP MANAGEMENT

RELATED APPLICATIONS

The present application is a continuation of U.S. application Ser. No. 17/239,430, filed Apr. 23, 2021 and entitled "SYSTEM, METHOD, AND COMPUTER PROGRAM FOR BLOCKCHAIN-BASED ENTITY GROUP MANAGEMENT," the entire contents of which is incorporated herein by reference.

FIELD OF THE INVENTION

The present invention relates to platforms for group management.

BACKGROUND

Group management platforms are tools that provide functionality in association with groups of entities (e.g. users). The functionality typically includes messaging, scheduling, collaborating, etc. These platforms are useful to allow users to perform certain functions within their own managed group.

Unfortunately, commercially available group management platforms are associated with various limitations. For example, available platforms are generally limited in group-based functionality (e.g. services) they enable. More importantly, they are oftentimes vulnerable to attacks, such as unwanted interference of group management.

There is thus a need for addressing these and/or other issues associated with the prior art.

SUMMARY

As described herein, a system, method, and computer program are provided for blockchain-based entity group management. An instance of a blockchain is maintained for each entity group of a plurality of defined entity groups. Further, the instance of the blockchain maintained for each entity group of the plurality of defined entity groups is utilized to manage group membership for the entity group, and control access by members of the entity group to a plurality of services having functionality configured for the plurality of defined entity groups.

DETAILED DESCRIPTION

Figure 1:
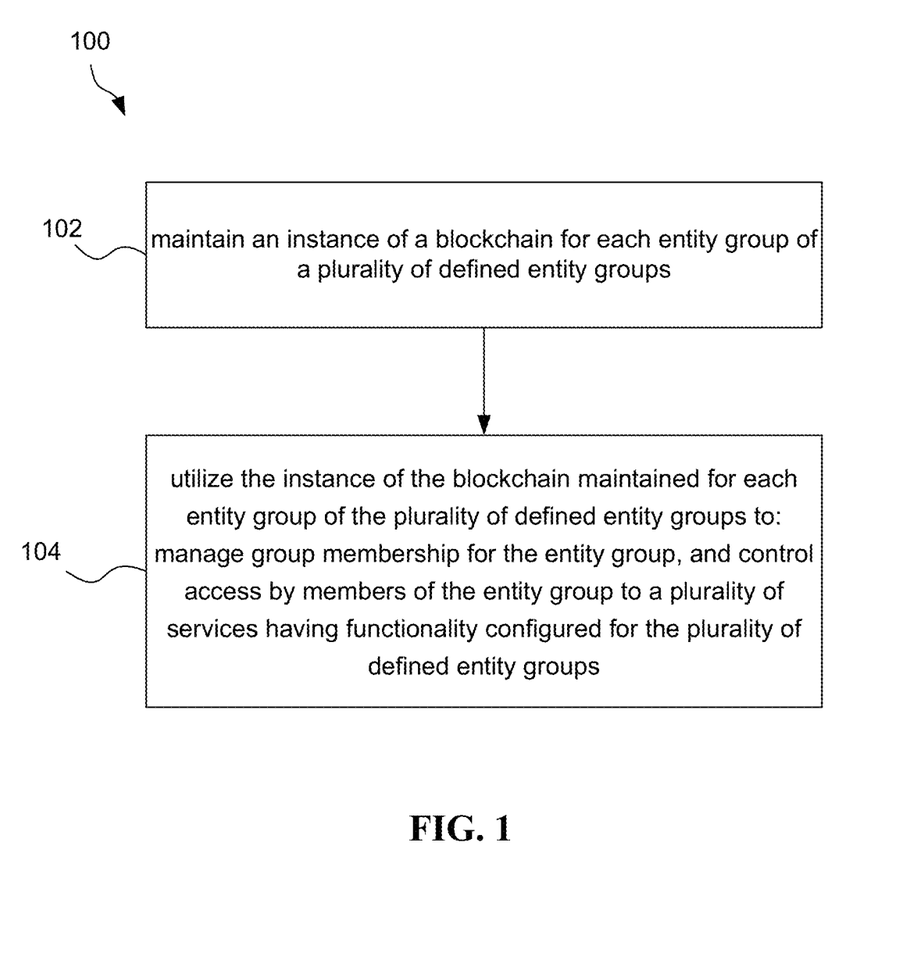
FIG. 1 illustrates a flowchart of a method for blockchain-based entity group management, in accordance with one embodiment.

FIG. 1 illustrates a flowchart of a method 100 for blockchain-based entity group management, in accordance with one embodiment. The method 100 may be performed by a computer system or a combination of connected (wired or wireless) computer systems. Various exemplary embodiments of computer systems are described below with reference to FIGS. 7 and/or 8. Further, it should be noted that the entity group may also be referred to herein as a "clan."

In operation 102, an instance of a blockchain is maintained for each entity group of a plurality of defined entity groups. An entity group refers to a grouping of two or more entities. Entities of an entity group may be referred to as members of the entity group. The entities in an entity group may be users, devices, or a combination thereof.

As noted above, the entity groups are defined. A unique identifier, members of the entity group, and/or any other information may be used to define the entity groups. In one embodiment, each entity group may be created by a founding member of the entity group. For example, a founding user (entity) may create the entity group, such as by providing a name of the entity group, by inviting other entities to join the entity group, allowing requesting entities into the entity group, etc.

As also noted above, an instance of a blockchain is maintained for each entity group. The instance of the blockchain may be created when the entity group is first defined (i.e. created). A blockchain is a digitized, decentralized, public ledger containing crypto transactions, which constantly grows as "completed" blocks (representing transactions) are recorded and added to it in chronological order. The blockchain allows the eco-system participants to keep track of the digital transactions without central recordkeeping. Each node (i.e. a computer connected to the network) gets a copy of the blockchain, which is updated automatically.

By maintaining an instance of the blockchain for each entity group, a secure record of transactions associated with the entity group may be maintained and used as described below. As an option, a profile may be stored in the instance of the blockchain for each member of the entity group. The profile may identify the member, and may optionally indicate permissions configured for the member (e.g. configured by the founding member or another member with required permissions to set permissions for other members). The permissions may relate to whether the member is allowed to modify (e.g. add, remove, change) members of the entity group and/or whether the member is allowed to access (e.g. use) each service available to the entity group. As another option, the profile may store a reputation of the member calculated using a service available to the entity group.

In operation 104, the instance of the blockchain maintained for each entity group of the plurality of defined entity groups is utilized to manage the entity group. In particular, the instance of the blockchain is used to manage group membership for the entity group. Managing the group membership for the entity group may include adding, removing, and/or changing a status of members of the group via the instance of the blockchain. Any addition, removal, or change to the status of a member may be recorded in the instance of the blockchain. Accordingly, at any point in time current entities included in the entity group may be determined from the instance of the blockchain.

The instance of the blockchain is also used to control access by members of the entity group to a plurality of services having functionality configured for the plurality of defined entity groups. The services may be local services (i.e. provided by the platform on which the instance of the blockchain is maintained) or may be remote third party services (i.e. provided by third parties on computer systems remotely located with respect to the platform on which the instance of the blockchain is maintained). Some of the services may optionally be integrated services, or in other words may be services that rely on the functionality of other services. More details regarding the services will be provided below with reference to the subsequent figures.

In one embodiment, controlling access by the members of the entity group to the plurality of services may include permitting (or denying) access to the plurality of services by the members of the entity group. The access control may be performed based on permissions stored in the instance of the blockchain for the members of the entity group (e.g. stored on the entity profiles, as mentioned above).

The instance of the blockchain may be further used for various other purposes. In one optional embodiment, the instance of the blockchain may be used for sending notifications to the members of the entity group. The notifications may be issued by the services and/or the members of the entity group.

In another optional embodiment, the instance of the blockchain may be used for communicating messages between specified members of the entity group. In yet another optional embodiment, the instance of the blockchain may be used for authentication of the members of the entity group. Further to this optional embodiment, the instance of the blockchain may be used in combination with one of the services for the authentication of the members of the entity group.

In still yet a further optional embodiment, the instance of the blockchain may be used for creating a contract between two of the members of the entity group. For example, the contract may be created using the instance of the blockchain by receiving a request from a first member of the entity group, storing the request in the instance of the blockchain, notifying at least one second member of the request, based on a request subscription of the second member, receiving a proposal to fulfill at least a portion of the request from the at least one second member, storing the proposal in the instance of the blockchain, and notifying the first member of each received proposal stored in the instance of the blockchain for creation of a contract based on a selected proposal. Thus, the contract may refer to an agreement between two or members of the entity group to fulfill some request. Optionally, member profiles, as described above, may allow the best matched and trusted transaction blockchain bidding for actions involving applying requests, proposal and profile for achieving an entity group transaction.

To this end, the method 100 may be performed to manage entity groups in a manner that is dependent on blockchain technology. Use of the blockchain may provide security to the entity group, such as by providing a secure record of transactions executed in association with the entity group. Further, the method 100 may allow the entity group to access a wide variety of services, which may be internal or external to the platform on which the method 100 executes.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
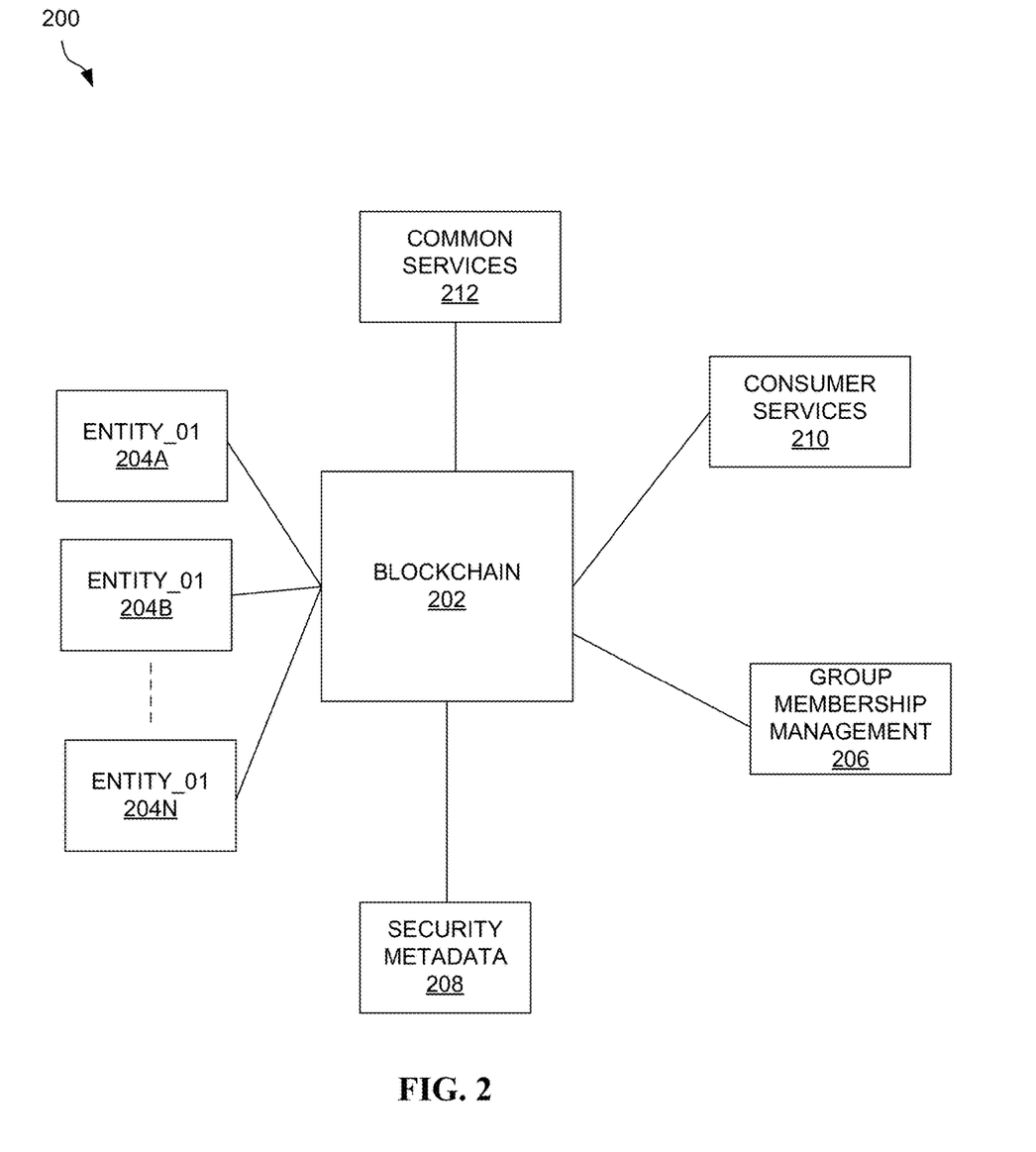
FIG. 2 illustrates a system flow diagram for blockchain-based entity group management, in accordance with one embodiment.

FIG. 2 illustrates a system 200 flow diagram for blockchain-based entity group management, in accordance with one embodiment. As an option, the system 200 may be implemented in the context of the details of the previous figure and/or any subsequent figure(s). For example, the system 200 may include the platform mentioned above on which method 100 of FIG. 1 executes. Of course, however, the system 200 may be implemented in the context of any desired environment. Further, the aforementioned definitions may equally apply to the description below.

As shown, a blockchain 202 is provided for entity group management. A plurality of entities 204A-N are included in an entity group which is defined using a group membership management service 206. Each of the entities 204A-N may be a person or a device with communication ability (e.g. car, drone, robot, router, etc.).

Upon creation of the entity group, the blockchain 202 is also created for use by the entity group. The blockchain 202 may store profiles for the entities 204A-N. Each entity 204A-N may have multiple compute devices and multiple profiles. For example, an entity (person) may have a cellphone and tablet and login to the group membership platform on each device with different profiles such as: Home profile; Work profile; Entertainment profile; Other profile details.

All transactions associated with the entity group are recorded in the blockchain 202. For example, any updates to the entity group are recorded in the blockchain 202. In this regard, the entity group may be open to any entity to be joined, removed, updated or changed to be inactive. As another example, security metadata 208 defined for the members of the entity group, such as member permissions, is recorded in the blockchain 202.

As yet another example, use of services, including consumer services 210 and common services 212, by the members of the entity group are recorded in the blockchain 202. Consumer services 210 may refer to third party services and common services 212 may refer to local services. Use of the services may include notifications sent to the members by the services, messages communicated between the members via the services, etc.

As an option, an entity 202A-N (as publisher) may use the blockchain 202 to publish a request to contract with other entities in the group. The request is an application that contains one or more requirements to be satisfied. Any entity 202A-N (as subscriber) in the group can subscribe to requests published to the blockchain 202. The subscriber can offer a proposal of request fulfilment via the blockchain 202. The proposal can cover request requirements fully or partially depending on the profile of the subscriber. The publisher can select a desirable proposal and thus create a contract, such as a Blockchain Smart Contract. A smart contract refers to a computer protocol intended to digitally facilitate, verify, or enforce the negotiation or performance of a contract. Smart contracts allow the performance of credible transactions without third parties. These transactions are trackable and irreversible. Thus, the blockchain

202 may use a publish/subscribe mechanism that enables the entities 202A-N to subscribe to requests and receive notifications, as well as provide entities 202A-N with an interface to publish the requests.

The blockchain 202 provides the functionality for the entity group such as:
1) Security—Peer-to-peer blockchain networks lack centralized points of vulnerability that computer crackers can exploit; likewise, it has no central point of failure. Blockchain security methods include the use of public-key cryptography.
2) Notification—entity groups are used for notifying member entities about blockchain transactions they have or data which is being requested.
3) Communication between entities—Blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority.

Figure 3:
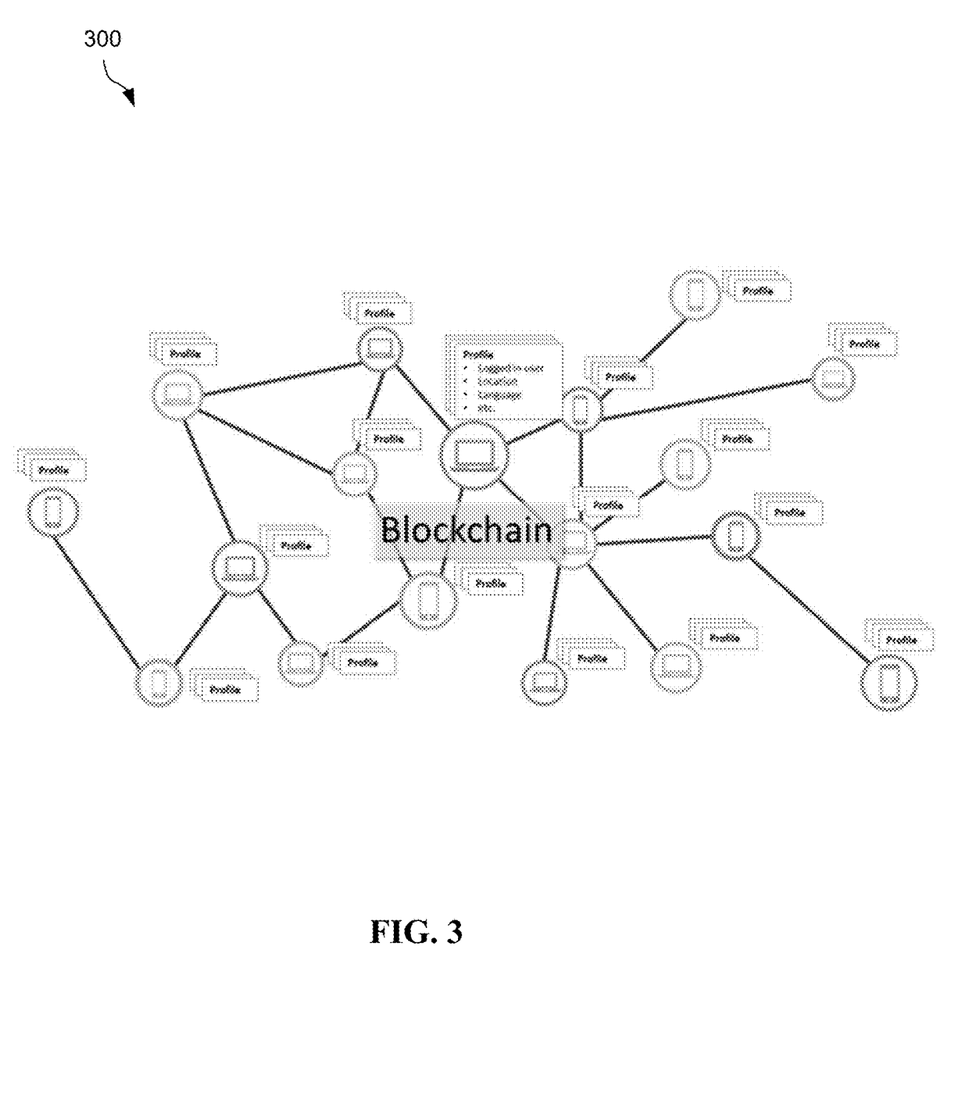
FIG. 3 illustrates a block diagram of group membership managed by an instance of a blockchain, in accordance with one embodiment.

FIG. 3 illustrates a block diagram of group membership 300 managed by an instance of a blockchain, in accordance with one embodiment. As an option, the group membership 300 may be managed in the context of the details of the previous figure and/or any subsequent figure(s). For example, the group membership 300 may be managed by a combination of the blockchain 202 and the group membership management service 206 of FIG. 2. Of course, however, the group membership 300 may be managed in the context of any desired environment. Further, the aforementioned definitions may equally apply to the description below.

A founding entity (moderator) creates a new entity group in response to which a new instance of a blockchain is also created. The founding entity accepts or rejects entity membership requests received from other entities. The moderator role can be shared with other entities in the entity group.

Each new entity gets its own profile which is presented in blockchain as the entity dedicated node. The profile describes the entity-specific abilities/disabilities and other properties such as: Common information (e.g. name, location, etc.), entity compute device(s) properties (e.g. personal cellphone, PC, etc.), requirements, other entity relationships, etc. Each entity can implement create, read, update, and delete (CRUD) operations on its own profile.

Each entity in the entity group may also have its own reputation property stored in its profile. This property may be calculated by any external third party application programming interface (API) which allows the calculation of a reputation for various entity functionalities such as responsiveness, availability, etc.

Figure 4:
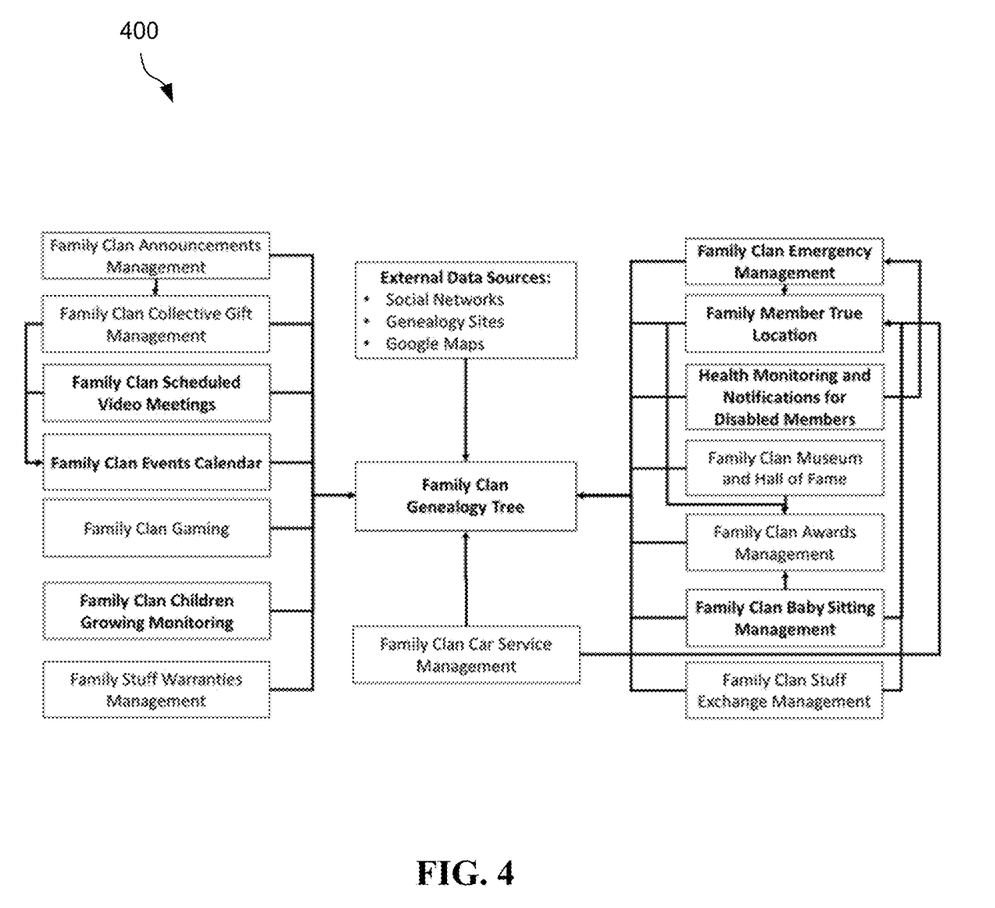
FIG. 4 illustrates a block diagram of data flow and integration of services having functionality configured for entity groups and exemplarily implemented as blockchain-based entity management for Family Clan Services, in accordance with one embodiment.

FIG. 4 illustrates a block diagram of data flow and integration of services 400 having functionality configured for entity groups, in accordance with one embodiment. As an option, the services 400 may be implemented in the context of the details of the previous figure and/or any subsequent figure(s). For example, the services 400 may be made accessible to entity groups. Of course, however, the services 400 may be implemented in the context of any desired environment. Further, the aforementioned definitions may equally apply to the description below.

As shown, there are numerous services that may service an entity group. All services may utilize a Standard Notification Service for notification exchange between subscribed entities in an entity group.

Services for family-centric entity groups can be entirely, or partly, applicable also to large geographically distributed groups such as corporate departments, consumer clubs, hobby clubs, etc.

Security, including an authentication service, can be provided by the specific smart home hub service functionality as well by the blockchain.

Some service integrations may also exist. For example, a member of an entity group in any service may be linked to Family Clan Genealogy Tree service and can be located there, as shown.

Table 1 illustrates various examples of services which may be supported for use by entity groups.

TABLE 1

| # | Service Name | Scenario/Description/Example |
|---|---|---|
| 1 | Family Clan Genealogy Tree, enriched with audio/video/photo sources | |
| 2 | Family Clan Member True Location | In case of emergency case of a Family Clan member it could be critical to find the closest other member, utilizing, for example, Google Map layers |
| 3 | Family Clan Knowledgebase | Wiki-like knowledgebase to store: recipes, memories, know-how, tasks, projects, etc. |
| 4 | Family Clan Archives | Photo/Video/Audio/Documents/Online & Offline Library |
| 5 | Family Clan Software/Hardware Repository | Tools, apps, utilities, 3d printers (for printing family souvenirs), etc. |
| 6 | Family Clan License Management | To benefit from license exchange inside Family Clan |
| 7 | Family Clan Vehicle/Real Estate Sharing/Pooling | Ex: cars, yachts, plains, horse, appartements, palaces, etc. |
| 8 | Family Clan Scheduled Video Meetings between connected families | Schedule daily/weekly/any other video meetings between parents and children, grands and grandchildren, etc. |
| 9 | Family Clan Brainstorm Management | To resolve urgent or complex family issues |
| 10 | Family Clan Events Calendar | Birthdays, dinners, meetings, vacations, parties, etc. |
| 11 | Family Clan Event Management | Organizational tasks distribution, workflow, etc. for Family Clan dinners, happenings, lectures, knowledge exchange, etc. |

TABLE 1-continued

| # | Service Name | Scenario/Description/Example |
|---|---|---|
| 12 | Family Clan Sport Events Management | To organize family sport teams, schedule training, see together sport events, etc. |
| 13 | Family Clan Mutual Travel Management | Tickets, flights, guides, hotels, sightseeing's |
| 14 | Family Clan Gaming | Ex.: grandchildren from different families want to play with each other or grandfather and his grandson want to play chess, trivia, etc. |
| 15 | Family Clan Education | Ex: grandmother desires to teach Italian to the family grandchildren, grandson wants to teach his grandfather to play "Fortnite" |
| 16 | Family Clan Entertainment Recommendations | Based on the family accumulated experience, routes, hotels, sightseeing's, etc. |
| 17 | Family Clan Product/Service Recommendations | Based on the family accumulated experience |
| 18 | Family Clan Task Management | To manage the family-scale tasks |
| 19 | Family Clan Stuff Exchange Management | Things that a single family or family member wants to contribute or sell with discount to other family members |
| 20 | Family Clan Project Management | To manage the family-scale projects |
| 21 | Family Clan Announcements Management | |
| 22 | Family Clan Collective Gift Management | Money management for collective gift |
| 23 | Family Clan Fund Raising Management | Collect money for Family Clan target |
| 24 | Family Clan Baby Sitting Management | |
| 25 | Family Clan Home Pets Care Management | |
| 26 | Health Monitoring and Notifications for 3rd age families or disabled families | See 1.6.5 Connected Health Care in "5G the Connected World" publication |
| 27 | Family Clan Emergency Management | Detect home abnormal behavior based on AI algorithms, integrated with Family Member True Location for finding the closest one (see #2 and #26) |
| 28 | Family Clan Member, Authorization and Profile Management | User, Role and Profile Management - can be based on Amazon Vindicia subscription/profile service |
| 29 | Family Clan Purchase Management | Ex: Get a discount when ordering significant amount of goods for the Family Clan |
| 30 | Family Clan Museum and Hall of Fame | Present outstanding family members and their achievements, ex: automatically generating 360 VR video and using VR glasses |
| 31 | Data Exchange between Family Clans | Ex: Knowledgebase exchange between Family Clans like recipes, know-how, etc. |
| 32 | Integration with and import/export from/to Social Networks, Genealogy Sites | Ex: MyHeritage, Ancestry, etc. |
| 33 | Family Stuff Warranties Management | Keep all warranty documents - especially important for 3rd age families |
| 34 | Family Clan Shopping List Management | Ex: When I buy food, I can buy also for my parents or my daughter's family |
| 35 | Recipe to Shopping List Convertor | Convert recipe to convenient shopping list, where recipe comes from Family Clan Knowledgebase (see #3) |
| 36 | Family Clan Awards Management | All Family Clan personal contributions are rewarded with points and presented at Family Hall of Fame (see #30) |
| 37 | Family Clan Budget Management | Money management required for Family Clan mutual tasks |
| 38 | Family Clan "Car Service" Management | Schedule and carry a child to school, sport activity, hobby group or grandmother to medical appointment and back to home |
| 39 | Family Clan Children Vaccination Management | Vaccination is health-critical info, especially for growing children |
| 40 | Family Clan Children Growing Monitoring | Ex: Grandmother brings her grandson to physiotherapy and she needs to know the previous status and what should be verified with a doctor |
| 41 | Marriage Planner Service | |
| 42 | Divorce Planner Service | |

Services can be implemented as Software as a service (SaaS) applications or at any smart home hub that supports a Service Oriented Architecture.

Figure 5:
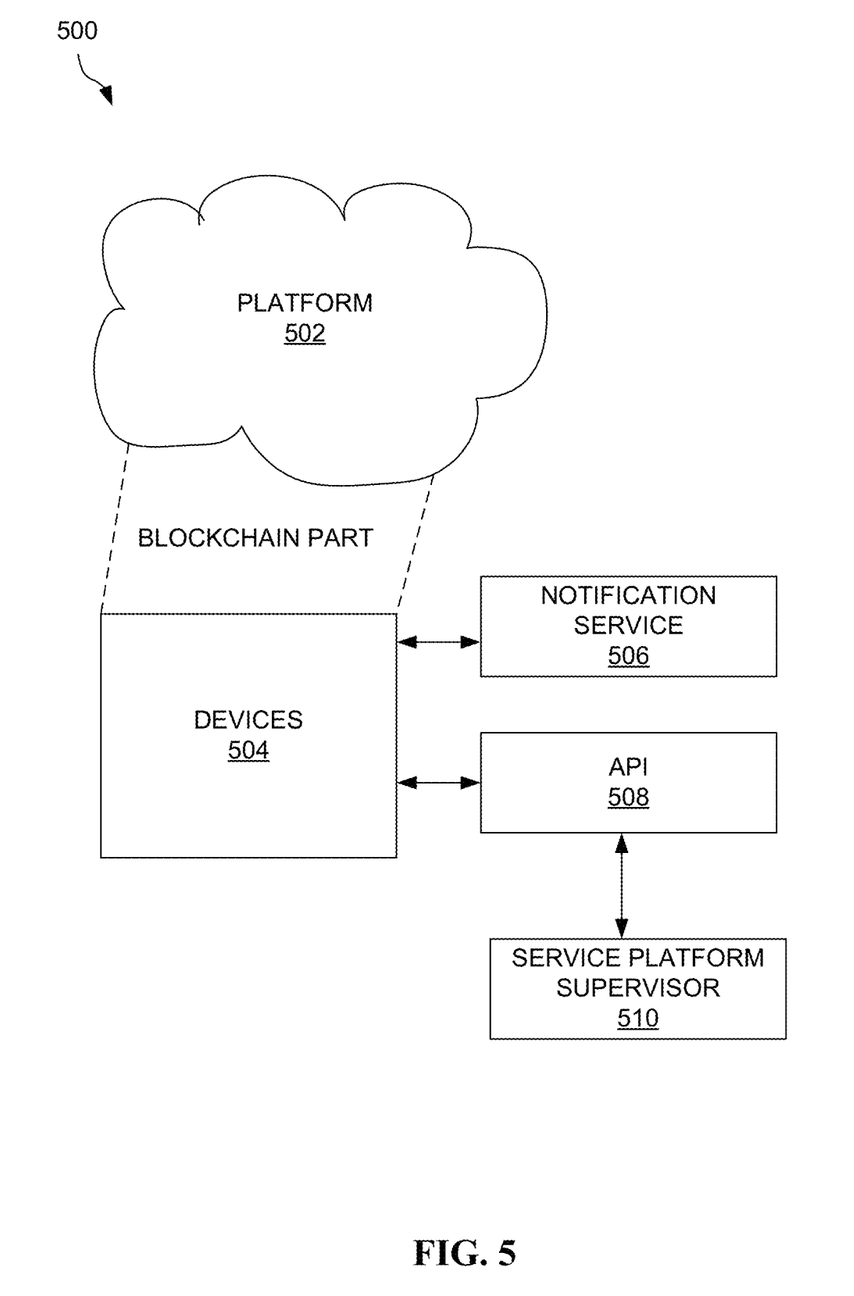
FIG. 5 illustrates a system flow diagram for a platform providing blockchain-based entity group management which may be implemented in the context of any desired environment, in accordance with one embodiment.

FIG. 5 illustrates a system flow diagram for a platform 500 providing blockchain-based entity group management, in accordance with one embodiment. As an option, the platform 500 may be implemented in the context of the details of the previous figure and/or any subsequent figure(s). Of course, however, the platform 500 may be implemented in the context of any desired environment. Further, the aforementioned definitions may equally apply to the description below.

An platform-specific application is installed on compute devices 504 of each member of an entity group. The devices 504 may be Doxy, Amazon Alexa, Google Home, Apple Homepad, television, television set top box, smart devices, etc. This application communicates with rest of the platform 500 in two ways:

1) With Service Platform Supervisor (SPS) 510 for common services such as security authentication and authorization, notifications and audit. SPS 510 communicates with devices, such as Doxy, via a publicly available application programming interface (API) 508 for available services such as authentication, cyber, sensors, home security, alerts, connectivity, streaming, etc. Publicly available API 508 provides developers with programmatic access to the platform 500.

SPS 510 is part of the platform 500, deployed on the cloud, and is responsible for managing available services, identities/roles/policies, security layer, entity group service subscriptions, etc. SPS 500 is also responsible for collecting entity group services usage data, which may be used for analytics, auditing, billing, etc.

2) With cloud-based business layer services such as Family Clan Genealogy Tree, Family Clan True Location and others.

A notification service 506, which is a part of platform 500 and is deployed on the cloud, is responsible for delivering messages between entities in the entity group.

Use Case Scenarios

The platform 500 may be used, in one embodiment, for family groups (clans). For example, representation of a Family Clan as a Clan of Entities allows connecting of disconnected family generations (by vertical dimension: great grandmother and great grandfather to their grandchildren) as well families of first and second cousins (by horizontal dimension) that live in different town locations, towns or even countries.

For example, our days in many cases families of relatives (family clan) are disconnected and may have a lot of problems that can be easily mitigated with a help of relatives that live in the same town or even other country. Children do not communicate on a regular basis with their grandmothers and grandfathers and those suffer from lacking attention, care and inability to enjoy from their grandsons and granddaughters. The same relates also to families of first and second cousins as well. Also, members of a family don't really know what is going on in each of the single families because of a modern life style that requires being focused on everyday single-family tasks.

The present platform 500 is a suitable service platform that could facilitate relieving of a family clan everyday life and enrich the family clan communications for the mutual benefit of the family clan members. Families of relatives or groups will be able to enhance and enrich their relationships by means of better communications with families/groups in other locations using the platform 500. Various services available through such a platform 500 can help mitigate multiple social problems of modern families by consolidation of family relationships and can provide multiple benefits for family everyday life such as activating elderly families in raising children of young families, resolving everyday tasks of families of different generations based on the family synergy effect, etc.

Ultimately, this platform 500 facilitates building a stronger, more connected family clan with mutual assistance and integrity, better caring for both elderly and children, and common good memories. Additionally, this platform 500 mitigates to essential extent multiple issues of Family Clan members in crisis environments such as lockdowns, pandemics, emergency, conflicts, etc.

Use Case Scenario—Family Clan Member True Location Service

A The "Family Clan Member True Location" service is integrated with the following other services, as shown in FIG. 4: Family Clan Genealogy Tree, Family Clan Emergency Management, Family Clan Awards Management, Health Monitoring and Notifications for Disabled Members, and Family Clan Car Service Management.

Figure 6:
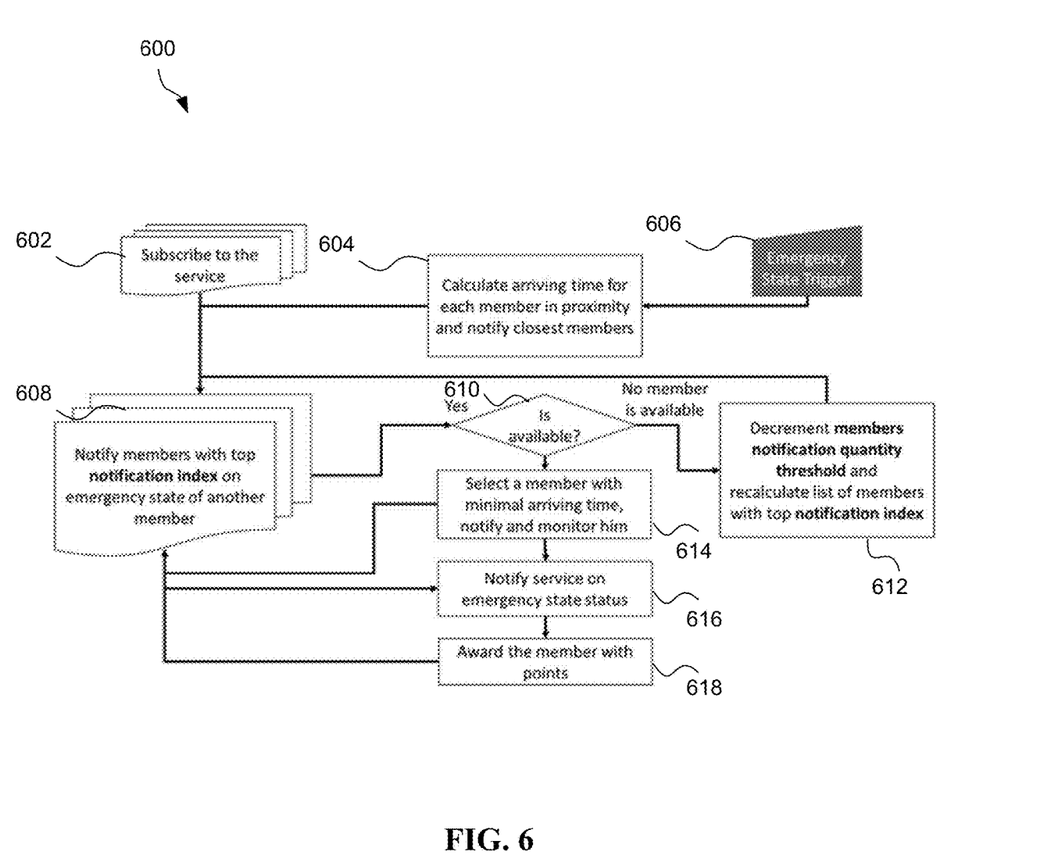
FIG. 6 illustrates a flowchart of a method for a location service providing member location functionality configured for entity groups, in accordance with one embodiment.

As shown in FIG. 6, the "Family Clan Member True Location" service executes as follows:

Members, subscribed to this service, install the appropriate smart device app (see operation 602). Then, their movements are tracked with geolocation services of their smart devices when activated.

Emergency state for a Family Clan member can be triggered (see operation 606) by any member from a restricted set of Family Clan members as per their roles. The service generates a notification index for all subscribed members. This notification index is calculated as per member maximum reputation and member minimal arrival time, for example using geolocation services. As result, the notification index has maximal value when reputation is maximal and arrival time is minimal. Members with a top notification index are notified (see operation 604). Members notification quantity threshold defines the number of top members as per their notification index. See operation 608.

The notified members respond on their availability (see operation 610). If no member is available then top notification index is recalculated with automatically decremented members notification quantity threshold (see operation 612). Otherwise, the service selects one or more of the responded members as per his minimal arriving time and his profile (see operation 614). The service monitors arriving and then staying in place of the selected member(s). The selected member(s) notifies the service on the emergency state status (see operation 616). The service awards the selected member with points (see operation 618 and see also for example service item #36—Family Clan Awards Management in Table 1).

Figure 7:
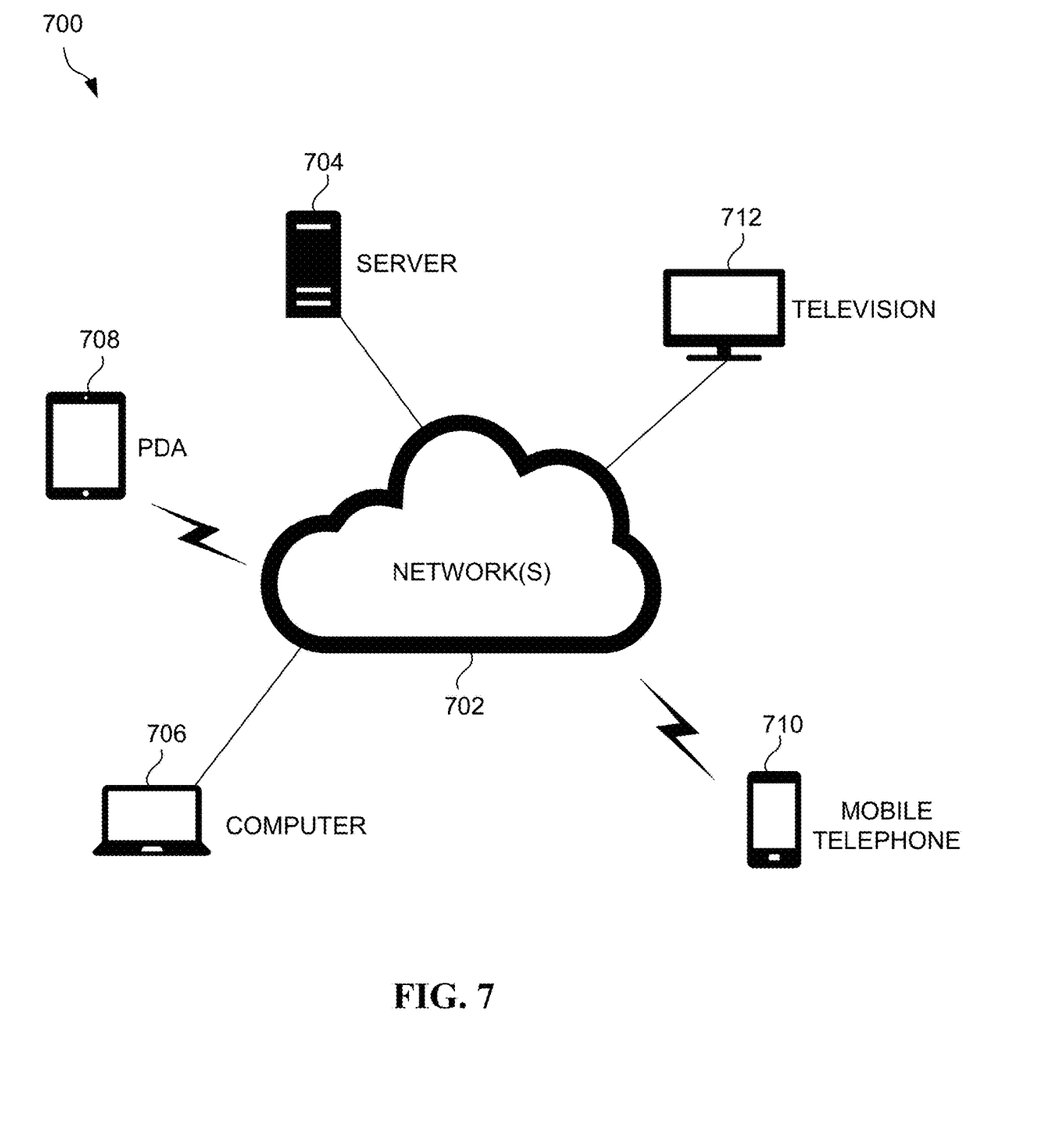
FIG. 7 illustrates a network architecture, in accordance with one possible embodiment.
Figure 8:
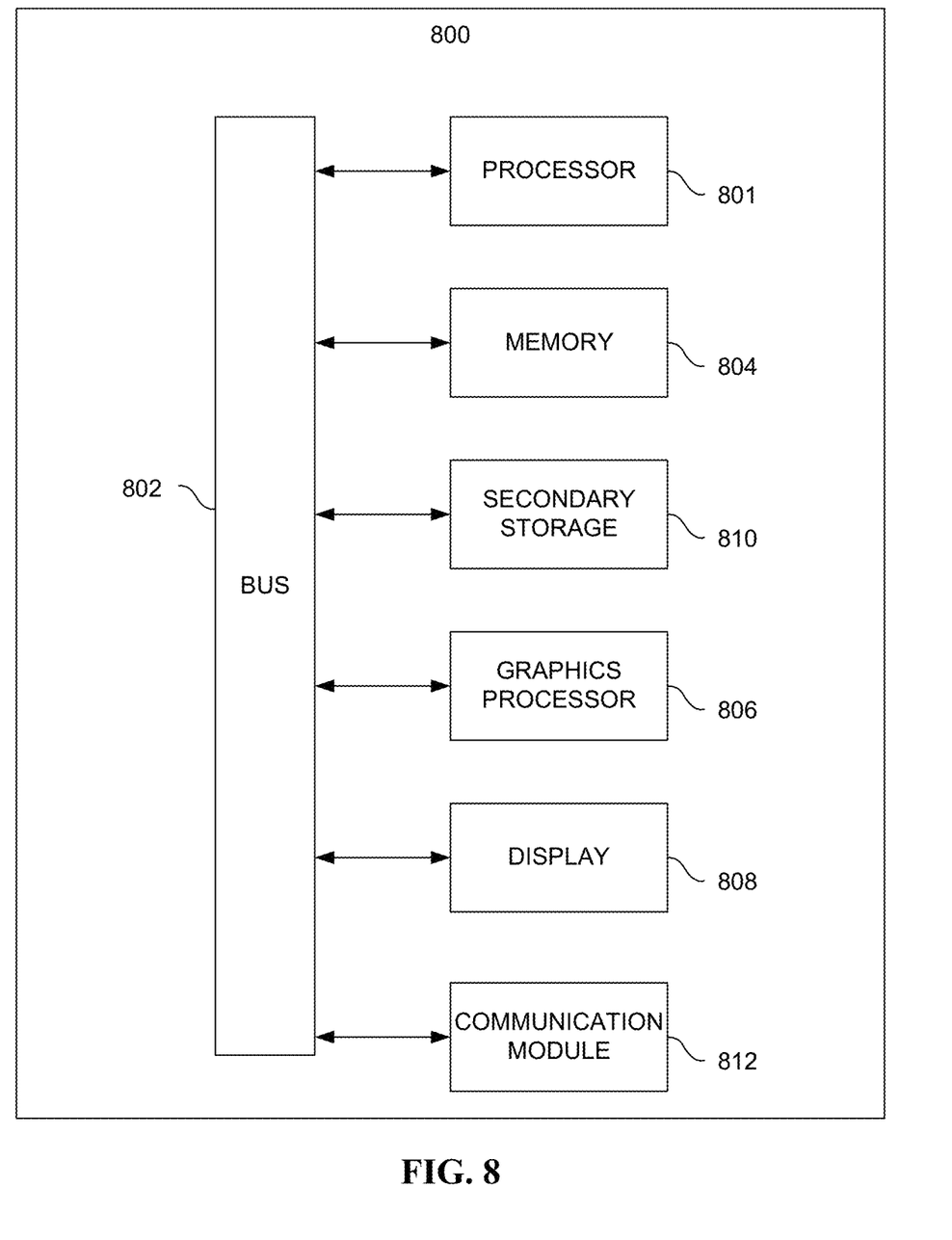
FIG. 8 illustrates an exemplary system, in accordance with one embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of non-transitory computer-readable media.

The system 800 may also include one or more communication modules 812. The communication module 812 may be operable to facilitate communication between the system 800 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
    define a plurality of entity groups, wherein each entity group of the plurality of defined entity groups includes a plurality of entities as members of the entity group;
    maintain a plurality of instances of a blockchain, each instance of the plurality of instances being maintained for a respective entity group of the plurality of defined entity groups;
    for each entity group of the plurality of defined entity groups, utilize the instance of the blockchain maintained for the entity group to:
    manage group membership for the entity group including recording in the instance of the blockchain each addition of a new member to the entity group and each removal of an existing member from the entity group,
    control access by the members of the entity group to a plurality of services having functionality configured for the plurality of defined entity groups by recording, in the instance of the blockchain, permissions to the plurality of services for the members of the entity group, and
    create a contract between two of the members of the entity group by:
        receiving a request from a first member of the entity group,
        storing the request in the instance of the blockchain,
        notifying at least one second member of the request, based on a request subscription of the second member,
        receiving a proposal to fulfill at least a portion of the request from the at least one second member,
        storing the proposal in the instance of the blockchain, and
        notifying the first member of each received proposal stored in the instance of the blockchain for creation of a contract based on a selected proposal.

2. The non-transitory computer-readable media of claim 1, wherein a profile is stored in the instance of the blockchain for each member of the entity group.

3. The non-transitory computer-readable media of claim 2, wherein the profile identifies the member and the permissions configured for the member.

4. The non-transitory computer-readable media of claim 3, wherein the profile further stores a reputation of the member calculated using a service of the plurality of services.

5. The non-transitory computer-readable media of claim 1, wherein each entity group of the plurality of defined entity groups is created by a founding member of the entity group.

6. The non-transitory computer-readable media of claim 1, wherein the plurality of services include local services.

7. The non-transitory computer-readable media of claim 1, wherein the plurality of services include remote third party services.

8. The non-transitory computer-readable media of claim 1, wherein the plurality of services include integrated services.

9. The non-transitory computer-readable media of claim 1, wherein the instance of the blockchain is further used for sending notifications to the members of the entity group.

10. The non-transitory computer-readable media of claim 9, wherein the notifications are issued, at least in part, by the plurality of services.

11. The non-transitory computer-readable media of claim 1, wherein the instance of the blockchain is further used for communicating messages between specified members of the entity group.

12. The non-transitory computer-readable media of claim 1, wherein the instance of the blockchain is further used for authentication of the members of the entity group.

13. The non-transitory computer-readable media of claim 12, wherein the instance of the blockchain is used in combination with a service of the plurality of services for the authentication of the members of the entity group.

14. The non-transitory computer-readable media of claim 1, wherein the plurality of entities include at least one of users or devices.

15. The non-transitory computer-readable media of claim 1, wherein managing group membership for the entity group further includes recording in the instance of the blockchain each change to a status of a member of the entity group.

16. The non-transitory computer-readable media of claim 1, wherein access to the plurality of services by the members of the group is permitted based on the permissions.

17. A method, comprising:
    at a computer system:
    defining a plurality of entity groups, wherein each entity group of the plurality of defined entity groups includes a plurality of entities as members of the entity group;
    maintaining a plurality of instances of a blockchain, each instance of the plurality of instances being maintained for a respective entity group of the plurality of defined entity groups;
    for each entity group of the plurality of defined entity groups, utilizing the instance of the blockchain maintained for the entity group to:
    manage group membership for the entity group including recording in the instance of the blockchain each addition of a new member to the entity group and each removal of an existing member from the entity group, control access by the members of the entity group to a plurality of services having functionality configured for the plurality of defined entity groups by recording, in the instance of the blockchain, permissions to the plurality of services for the members of the entity group, and create a contract between two of the members of the entity group by:
  receiving a request from a first member of the entity group,
  storing the request in the instance of the blockchain,
  notifying at least one second member of the request, based on a request subscription of the second member,
  receiving a proposal to fulfill at least a portion of the request from the at least one second member,
  storing the proposal in the instance of the blockchain, and notifying the first member of each received proposal stored in the instance of the blockchain for creation of a contract based on a selected proposal.

18. A system, comprising:
a non-transitory memory storing instructions; and
one or more processors in communication with the non-transitory memory that execute the instructions to:
  define a plurality of entity groups, wherein each entity group of the plurality of defined entity groups includes a plurality of entities as members of the entity group;
  maintain a plurality of instances of a blockchain, each instance of the plurality of instances being maintained for a respective entity group of the plurality of defined entity groups;
  for each entity group of the plurality of defined entity groups, utilize the instance of the blockchain maintained for the entity group to:
  manage group membership for the entity group including recording in the instance of the blockchain each addition of a new member to the entity group and each removal of an existing member from the entity group,
  control access by the members of the entity group to a plurality of services having functionality configured for the plurality of defined entity groups by recording, in the instance of the blockchain, permissions to the plurality of services for the members of the entity group, and
  create a contract between two of the members of the entity group by:
    receiving a request from a first member of the entity group,
    storing the request in the instance of the blockchain,
    notifying at least one second member of the request, based on a request subscription of the second member,
    receiving a proposal to fulfill at least a portion of the request from the at least one second member,
    storing the proposal in the instance of the blockchain, and
  notifying the first member of each received proposal stored in the instance of the blockchain for creation of a contract based on a selected proposal.

* * * * *